US010665113B2

(12) United States Patent
Manberg et al.

(10) Patent No.: US 10,665,113 B2
(45) Date of Patent: *May 26, 2020

(54) SYSTEMS AND METHODS FOR PROVIDING AN ADS-B IN DISPLAY AND CONTROL SYSTEM

(71) Applicant: AVIATION COMMUNICATION & SURVEILLANCE SYSTEMS, LLC, Phoenix, AZ (US)

(72) Inventors: Charles C. Manberg, Phoenix, AZ (US); Richard D. Ridenour, Peoria, AZ (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,324

(22) Filed: Jul. 8, 2019

(65) Prior Publication Data

US 2019/0340936 A1 Nov. 7, 2019

Related U.S. Application Data

(63) Continuation of application No. 15/854,364, filed on Dec. 26, 2017, now Pat. No. 10,347,138, which is a (Continued)

(51) Int. Cl.
*G08G 5/04* (2006.01)
*G08G 5/00* (2006.01)
(Continued)

(52) U.S. Cl.
CPC .......... *G08G 5/0021* (2013.01); *G01C 23/00* (2013.01); *G08G 5/0008* (2013.01);
(Continued)

(58) Field of Classification Search
None
See application file for complete search history.

(56) References Cited

U.S. PATENT DOCUMENTS 8,160,755 B2* 4/2012 Nichols ................. G06T 11/206
340/435
8,271,186 B2* 9/2012 Nouvel .................. G01C 23/00
701/10

(Continued)

*Primary Examiner* — Adolf Dsouza
(74) *Attorney, Agent, or Firm* — Dickinson Wright PLLC

(57) ABSTRACT

Various navigation and other instrumentation systems may benefit from appropriate methods for display of traffic. For example, certain avionics systems may benefit from systems and methods for providing an ADS-B In display and control system. A system can include a traffic computer, such as a Traffic Alert and Collision Avoidance System (TCAS) computer. The system can also include a TCAS traffic display, the traffic computer is configured to display Automatic Dependent Surveillance-Broadcast (ADS-B) In information on the TCAS traffic display. Optionally, the system can further include a graphical ADS-B In Guidance Display (AGD) operationally connected to the traffic computer. The system can additionally include a Multi-Purpose Control Display Unit (MCDU) operationally connected to the traffic computer. The TCAS traffic display and MCDU, and optionally the graphical AGD, can be configured to substitute for a Cockpit Display of Traffic Information (CDTI).

10 Claims, 8 Drawing Sheets

Related U.S. Application Data continuation-in-part of application No. 15/295,760, filed on Oct. 17, 2016, now Pat. No. 10,311,737.

(60) Provisional application No. 62/438,680, filed on Dec. 23, 2016, provisional application No. 62/242,753, filed on Oct. 16, 2015.

(51) Int. Cl.
*G01C 23/00* (2006.01)
*G08G 5/02* (2006.01)
*B64D 43/00* (2006.01)

(52) U.S. Cl.
CPC ......... *G08G 5/0052* (2013.01); *G08G 5/0078* (2013.01); *G08G 5/025* (2013.01); *G08G 5/045* (2013.01); *B64D 43/00* (2013.01)

(56) References Cited

U.S. PATENT DOCUMENTS

| | | | | |
|---|---|---|---|---|
| 8,786,467 B2* | 7/2014 | Clark | ...................... | G01C 23/00 340/947 |
| 2006/0265109 A1* | 11/2006 | Canu-Chiesa | ......... | G08G 5/045 701/3 |

* cited by examiner

Figure 2 Typical TCAS II Symbol Set

Figure 3 Typical Flight Deck MCDU

SYSTEMS AND METHODS FOR PROVIDING AN ADS-B IN DISPLAY AND CONTROL SYSTEM

CROSS-REFERENCE TO RELATED APPLICATIONS

This application is a continuation of U.S. patent application Ser. No. 15/854,364 filed Dec. 26, 2017, which is a continuation-in-part of U.S. patent application Ser. No. 15/295,760 filed Oct. 17, 2016, the entirety of which is hereby incorporated herein by reference, which in turn claimed the benefit and priority of U.S. Provisional Patent Application No. 62/242,753, filed Oct. 16, 2015. This application also claims the benefit and priority of U.S. Provisional Patent Application No. 62/242,753, filed Oct. 16, 2015, the entirety of which is hereby incorporated herein by reference. This application is also a non-provisional of, and claims the benefit and priority of, U.S. Provisional Patent Application No. 62/438,680 filed Dec. 23, 2016, the entirety of which is hereby incorporated herein by reference.

BACKGROUND

Field

Various navigation and other instrumentation systems may benefit from appropriate methods for display of traffic. For example, certain avionics systems may benefit from systems and methods for providing an ADS-B In display and control system.

Description of the Related Art

The useful life of a modern aircraft may be 20 years or more. During the lifetime of a given aircraft, many technological advances may be made that may result in new functionality that may be beneficial to have on the aircraft. For instance, new technology may provide better navigation accuracy, improved pilot awareness, increased passenger comfort, or any other desired advance.

One area of on-going technological advances is the Automatic Dependent Surveillance-Broadcast, known as "ADS-B". Two important components of ADS-B are "ADS-B Out" and "ADS-B In". ADS-B Out is the term given to the function whereby aircraft broadcast information such as global positioning system (GPS) position, speeds, and altitude over a radio frequency link so that the data can be received by Air Traffic Control, as well as other aircraft. ADS-B In is the term given to the function whereby an aircraft is configured to receive the ADS-B Out broadcasts from other aircraft and present select information regarding the other aircraft to the pilot.

A name given to a display that presents the ADS-B In information to the pilot and allows for the control of this information by the pilot is a Cockpit Display of Traffic Information, or CDTI. The CDTI may provide for the display of traffic information to the pilot for basic traffic situational awareness and allow the pilot to interact with the ADS-B In system for data entry or control. The data entry and control aspect of the CDTI may support ADS-B In applications/operations such as CDTI Assisted Visual Separation (CAVS), In-trail Procedures (ITP), Merging and Spacing (M&S)/Flight Deck Interval Management (FIM), and so on.

The advantages of ADS-B In include improved pilot awareness, which results in increased safety, and improved operational efficiency, which results in lower operating costs, reduced fuel burn, reduced carbon dioxide emissions, and reduced noise pollution.

Many current generation aircraft have electronic flight displays that can display a limited set of traffic icons that may be based on Traffic Alert and Collision Avoidance System II (TCAS II) functionality, as described and referenced in RTCA document DO-185B "Minimum Operational Performance Standards for Traffic Alert and Collision Avoidance System II (TCAS II)", FAA document TSO C119c, "Traffic Alert and Collision Avoidance System (TCAS) Airborne Equipment, TCAS II with Optional Hybrid Surveillance" and FAA document AC20-151B "Airworthiness Approval of Traffic Alert and Collision Avoidance Systems (TCAS II), Versions 7.0 & 7.1 and Associated Mode S Transponders" (each of the foregoing references being incorporated herein by reference).

FIG. 1 illustrates a TCAS traffic display. The particular traffic and values shown are just an example of a possible scenario. FIG. 2 illustrates a typical TCAS II traffic symbol set. As shown in FIG. 2, there can be various symbols, including "other traffic," "proximate traffic," "caution," and "warning," which can be provided with a relative altitude indication in the normal mode, or without altitude information in a non-altitude reporting mode. The normal symbols include an indication of relative altitude (altitude of target relative to own ship). The symbols can include a hollow diamond for other traffic, a solid diamond for proximate traffic, a circle for caution, and a square for warning. The diamonds may be cyan, the circles may be yellow, and the squares may be red.

Additionally, TCAS systems often have a selection to allow the pilot to choose if non-threatening traffic (i.e., Proximate and Other Traffic) are always displayed or only when a traffic alert occurs.

Today's aircraft may incorporate a Multi-Purpose Control Display Unit (MCDU) that provides a multifunction display-keyboard interface for pilot data entry and display of several types of aircraft system data. The MCDU may communicate with multiple aircraft systems and allow pilot display and control of systems such as a Flight Management System (FMS), a Communications Management Unit (CMU), a Central Maintenance Computer (CMC), or the like. FIG. 3 illustrates a representative MCDU. The particular displayed menu is just one example menu that can be displayed on such a display unit.

In contrast to a TCAS display, a full-up ADS-B In CDTI system typically requires many more symbols, such as symbols to represent Designated Traffic taken from RTCA document DO-317B "Minimum Operational Performance Standards (MOPS) for Aircraft Surveillance Applications (ASA) System" (the foregoing reference being incorporated herein by reference). FIG. 4 illustrates two examples of DO-317B designated traffic symbols. As can be seen by a comparison to FIG. 2, these symbols may differ from the simpler symbols shown there.

Additionally, a CDTI will often include bezel buttons or employ a cursor control device to allow the pilot to select or designate individual traffic from the display. FIG. 5 illustrates a representative CDTI. The bezel buttons may be arranged around the display, and may include zoom buttons as well as left, right, up, and down scrolling buttons. The center of the display may include an own ship identifier with heading, and icons for traffic aircraft in the vicinity of own ship. The particular traffic and values shown are just an example of a possible scenario.

SUMMARY

A system, according to certain embodiments can include a traffic computer, such as a Traffic Alert and Collision Avoidance System (TCAS) computer. The system can also include a TCAS traffic display, the traffic computer is configured to display Automatic Dependent Surveillance-Broadcast (ADS-B) In information on the TCAS traffic display. Optionally, the system can further include a graphical ADS-B In Guidance Display (AGD) operationally connected to the traffic computer. The system can additionally include a Multi-Purpose Control Display Unit (MCDU) operationally connected to the traffic computer. The TCAS traffic display, and MCDU can be configured to substitute for a Cockpit Display of Traffic Information (CDTI), or the AGD can be configured alone or with the other elements to substitute for the CDTI.

BRIEF DESCRIPTION OF THE DRAWINGS

For proper understanding of the invention, reference should be made to the accompanying drawings, wherein.

DETAILED DESCRIPTION

Retrofitting an aircraft to include a CDTI can be quite costly, particularly on aircraft with electronic flight displays. Cockpit display manufacturers often design the display systems so that new information cannot be presented on the displays without the display hardware and/or software being updated. The display manufacturers often charge a high price for these modifications.

It would therefore be advantageous to provide the ADS-B In display and control functionality, utilizing existing cockpit displays while minimizing any requirements for updating the cockpit displays.

Certain embodiments of the present invention provide systems and methods for incorporating an ADS-B In Display and Control system into retrofit aircraft for the purposes of performing ADS-B In applications. Use of existing flight deck systems, such as a Traffic Collision and Avoidance System (TCAS) Display and a Multi-purpose Control Display Unit (MCDU) are example devices that can support the ADS-B In/CDTI Display and Control System.

Updating existing displays and pilot input devices to the flight deck to provide ADS-B In and CDTI functionality may be challenging due to potential high cost to perform the updates.

Certain embodiments of the present invention may overcome the above challenges by using existing display and pilot input devices in new and novel ways and optionally supplementing the use of these displays with a small Graphical ADS-B In Guidance Display (AGD).

The combination of ADS-B In information displayed on the TCAS traffic display, the graphical AGD, and the MCDU constitutes an embodiment of an ADS-B In Display and Control System/CDTI in a retrofit aircraft.

In a system according to certain embodiments of the present invention, the TCAS computer (or other traffic computer) may be updated to provide at least the following capability to support ADS-B In Display and Control/CDTI functionality in the flight deck. For example, a modified traffic buffer can be incorporated. This modified traffic buffer may provide ADS-B In traffic to the existing TCAS traffic display to display both ADS-B In and TCAS traffic using typical TCAS symbology. Moreover, there may also be the addition of an ADS-B In traffic buffer, which may include TCAS traffic and ADS-B In specific data to transmit to the graphical AGD. Furthermore, there may an addition of an MCDU Interface and processing of input/outputs to one or more MCDUs. Moreover, there may be an addition of an MCDU display and entry page processing to provide display and control of ADS-B In and CDTI traffic information.

Figure 1:
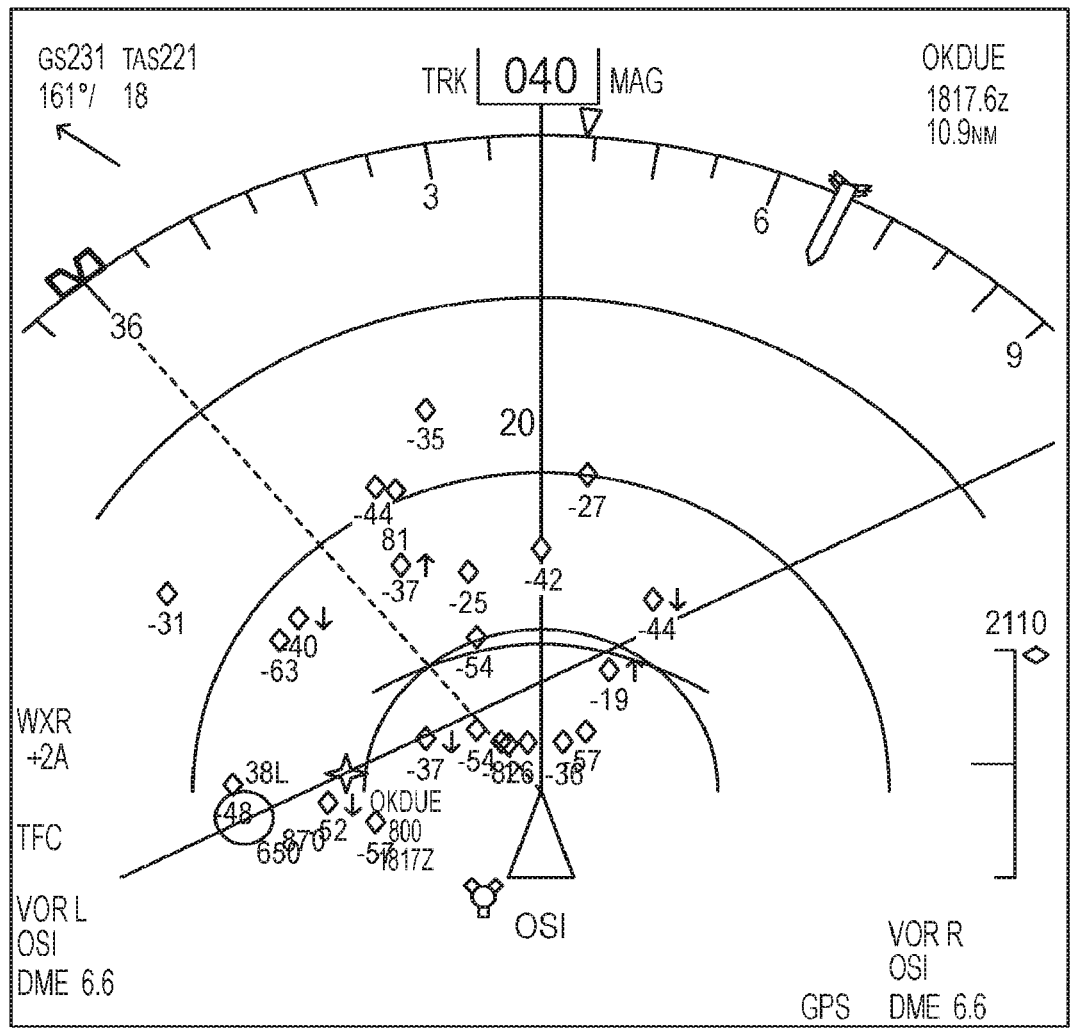
FIG. 1 illustrates a TCAS traffic display.
Figure 2:
FIG. 2 illustrates a typical TCAS II traffic symbol set.
Figure 3:
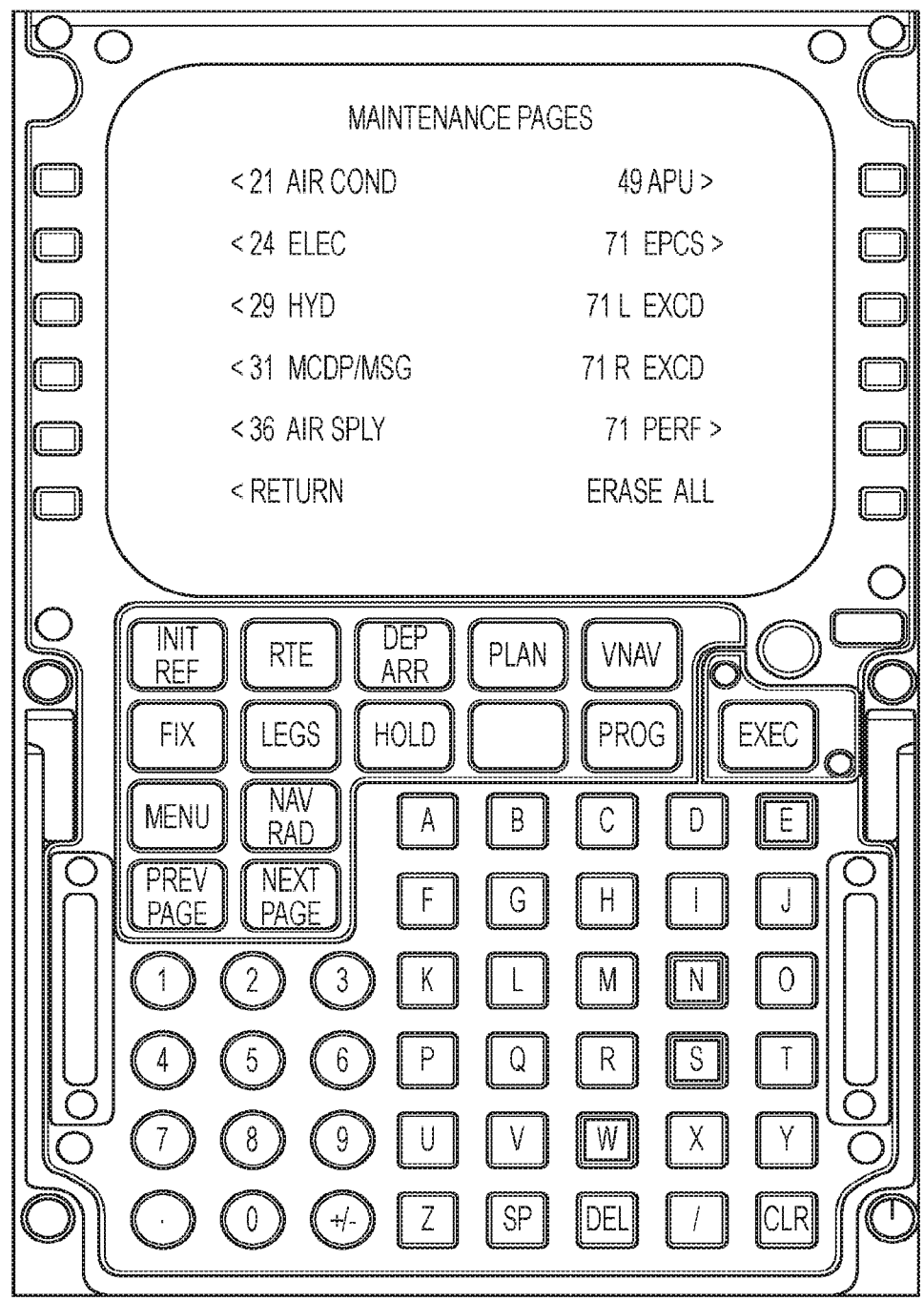
FIG. 3 illustrates a representative MCDU.
Figure 4:
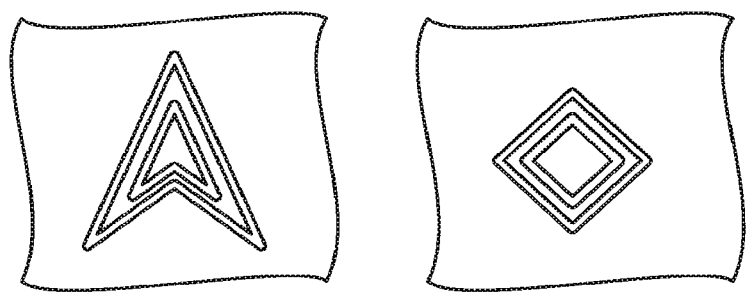
FIG. 4 illustrates two examples of DO-317B designated traffic symbols.
Figure 5:
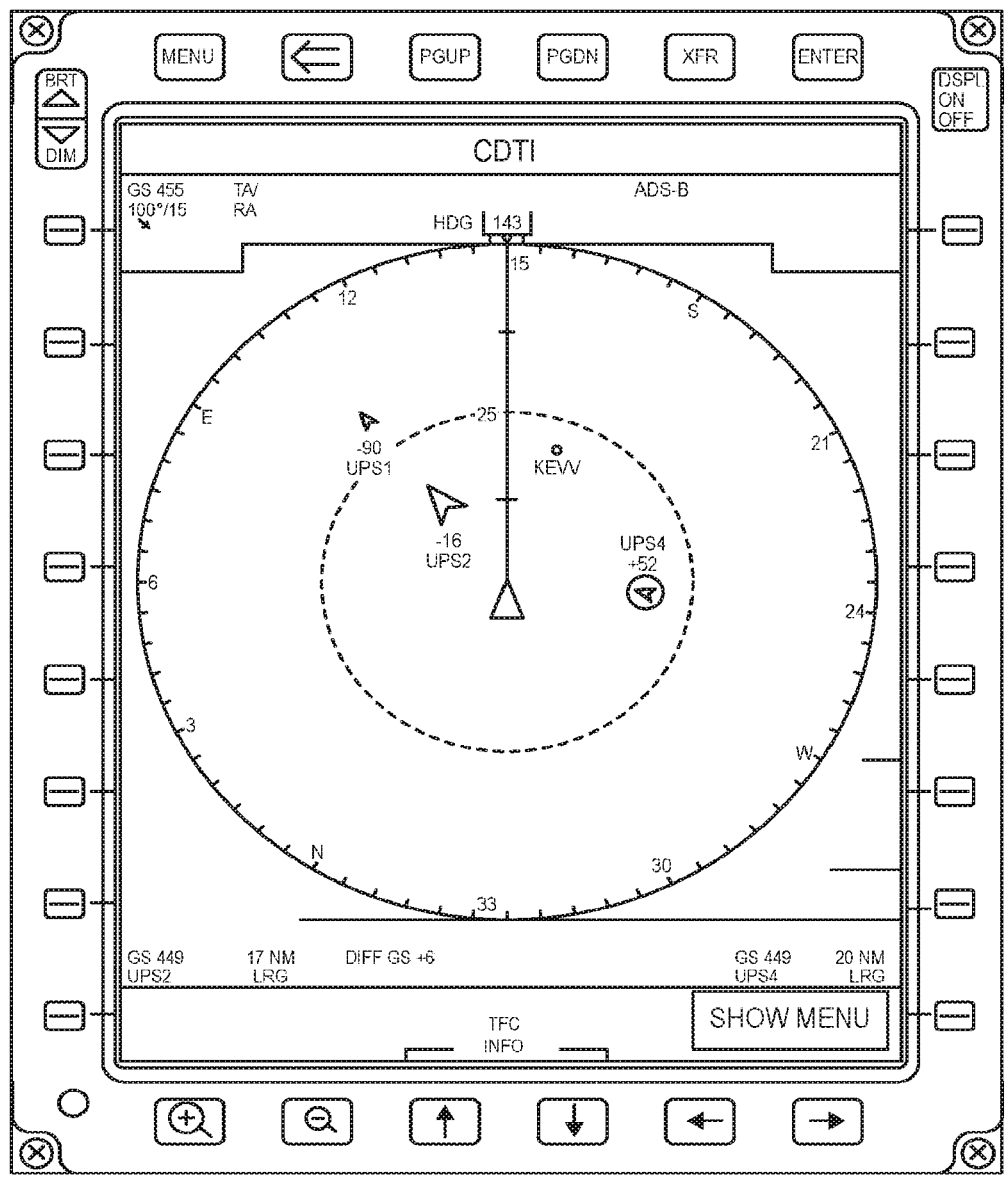
FIG. 5 illustrates a representative CDTI.
Figure 6:
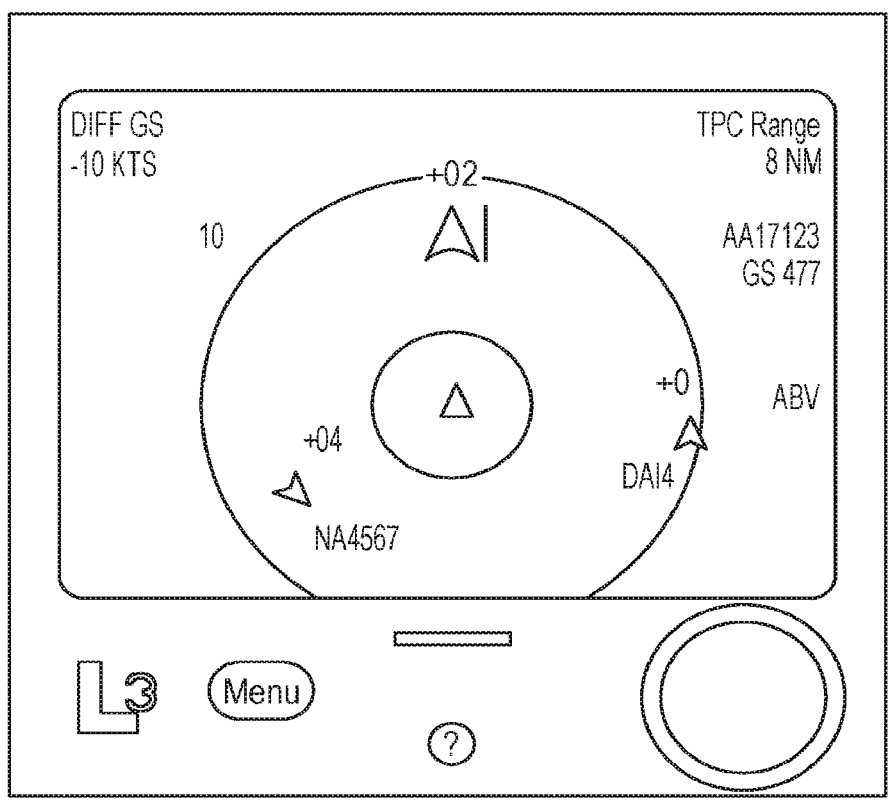
FIG. 6 illustrates a representative example of a graphical AGD, according to certain embodiments of the present invention.

The Graphical AGD may provide display of specific traffic information in the flight deck forward-field-of-view (FFOV) that may be required for performing ADS-B In operations/applications and cannot be implemented on the existing displays. The graphical AGD can either be a new display, replacing a flight deck standby indicator, such as a Radio Distance Magnetic Indicator (RDMI), or incorporated as an additional function in a standby indicator. FIG. 6 illustrates a representative example of a graphical AGD, according to certain embodiments of the present invention. The particular targets and values shown are just an example of a possible scenario.

In certain embodiment of the present invention, a TCAS computer unit may interface with one or more Multi-Purpose Control and Display Units (MCDU) using a protocol which may be essentially identical to the protocol defined in ARINC Characteristic A739A-1 "Multi-Purpose Control and Display Unit" (the foregoing reference being incorporated by reference).

The TCAS computer may process the control and data input from the MCDUs and transmit the traffic control and display information to support display of ADS-B In and CDTI traffic information on the MCDUs. The TCAS computer unit may additionally transmit any desired traffic data to the Navigation Displays (ND) TCAS traffic display which may be part of the Electronic Flight Instrument System (EFIS) and to one of more graphical AGD(s).

Figure 7:
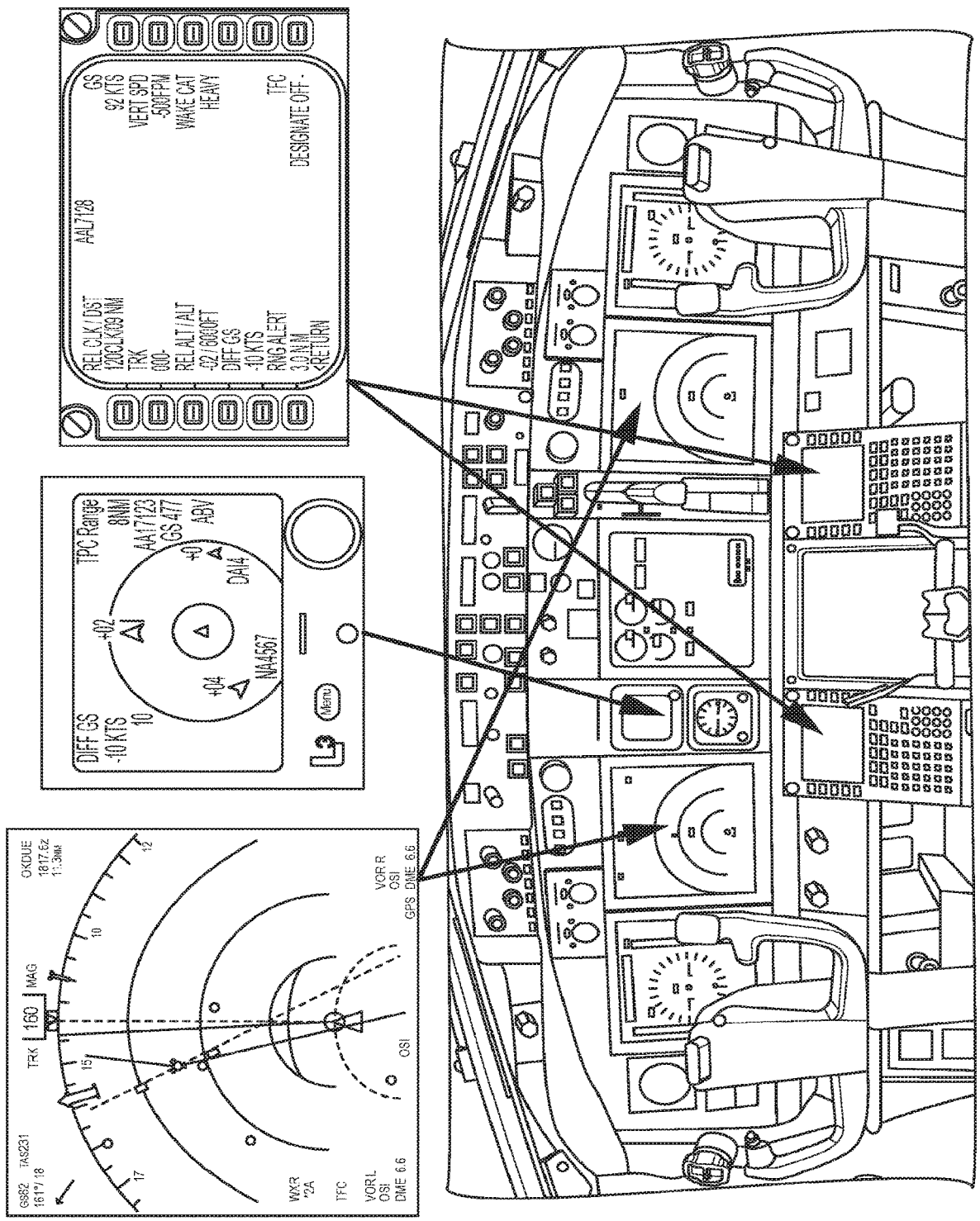
FIG. 7 illustrates a representative flight deck ADS-B In Display and Control System, according to certain embodiments of the present invention.

FIG. 7 illustrates a representative flight deck ADS-B In Display and Control System, according to certain embodiments of the present invention. The TCAS display shown at top left can be present in two places, for the pilot and the co-pilot. Likewise, the MCDU, shown at top right, can be present for the pilot and the co-pilot, in two places. Meanwhile, the graphical AGD may be present in a single location, in this case located closer to the pilot, namely on the left side of the cockpit. Other arrangements of the components, and other levels of redundancy of the components, are also permitted. The particular values and targets shown are just examples of particular scenarios.

Figure 8:
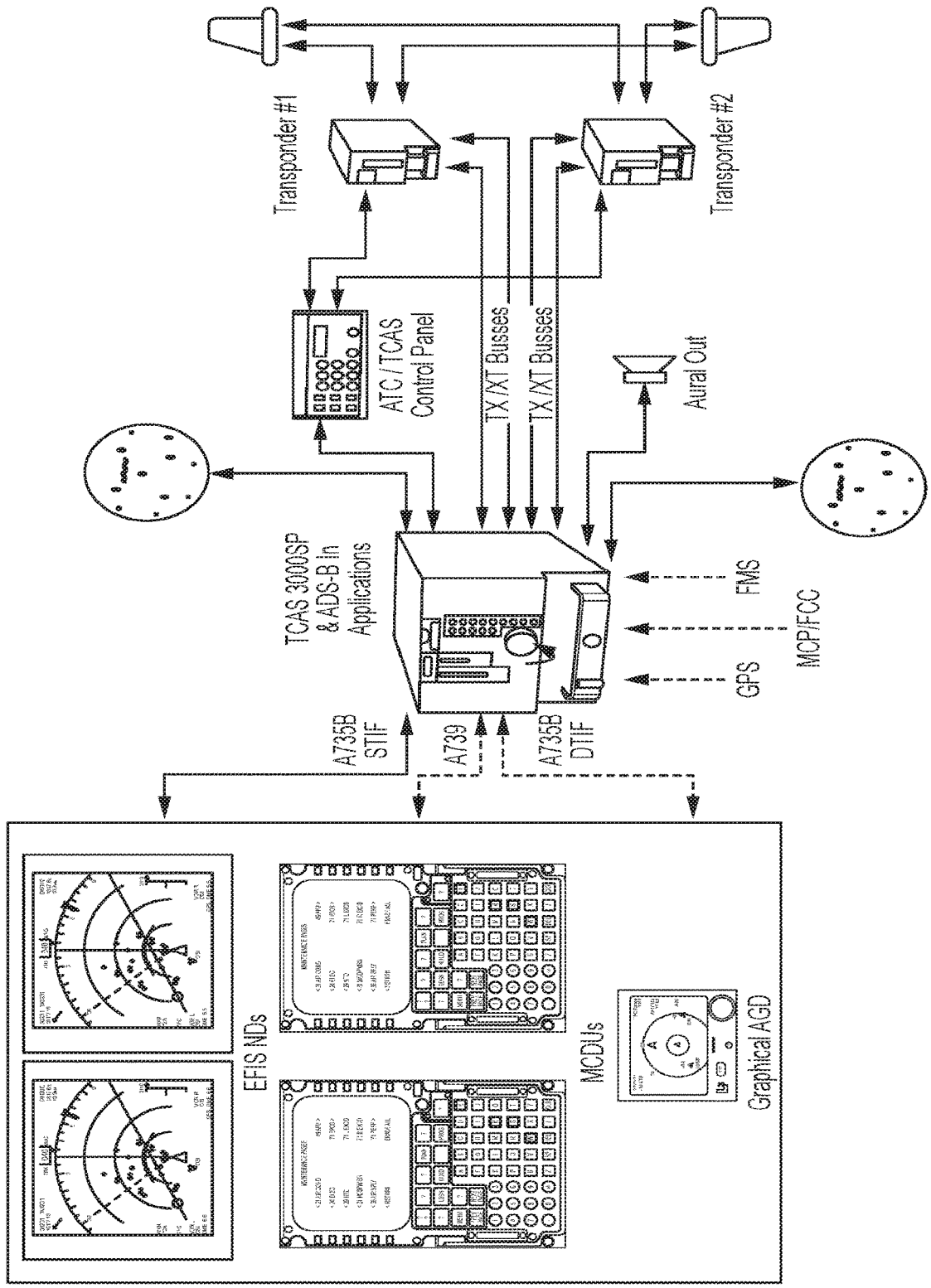
FIG. 8 illustrates a simplified block diagram of system components and interfaces of a system according to certain embodiments of the present invention.

FIG. 8 illustrates a simplified block diagram of system components and interfaces of a system according to certain embodiments of the present invention. As shown in FIG. 8, at the logical center of the system there may be a TCAS computer, with a variety of inputs and outputs. In this particular example, the computer is configured to handle TCAS 3000SP and ADS-B In applications. The computer can be equipped with top and bottom TCAS antennas. The computer can also be connected to transponders #1 and #2 by respective TX/XT busses. The transponders can, in turn, be connected to top and bottom antennas.

The computer can also be connected to an ATC/TCAS control panel. The control panel can be configured to control the transponders mentioned above. The computer can have an aural out interface, shown as a speaker. The computer may receive as inputs GPS, MCP/FCC, and FMS.

Additionally, the computer can be interfaced to a EFIS NDs, MCDUs, and a graphical AGD, as shown at left. The computer may use an interface, such as A735B TCAS Intruder File (STIF) to communicate with the EFIS NDs. The computer may use an A739 interface to communicate with the MCDUs. Likewise, the computer may use an A735B Display of Traffic Information File (DTIF) interface to communicate with the graphical AGD.

In certain embodiments, a system may include a traffic computer, such as a Traffic Alert and Collision Avoidance System (TCAS) computer. This may be any traditional TCAS computer. As illustrated in FIG. 8, the TCAS computer can include a variety of inputs and outputs. For example, the TCAS computer system can be provided with a top TCAS antenna, and a bottom TCAS antenna, each of which can be a directional antenna. The computer system may include an ATC/TCAS control panel. The ATC/TCAS control panel can be connected to transponder #1 and transponder #2. Each of the transponders may be connected to both a top antenna and a bottom antenna. The transponders can also be connected by TX/XT busses to the TCAS computer system. The TCAS computer system may be connected to a speaker or other aural output.

The system can also include a TCAS traffic display. The TCAS computer can be configured to display Automatic Dependent Surveillance-Broadcast (ADS-B) In information on the TCAS traffic display. This ADS-B In information can be displayed alone or in combination with other traffic information.

The system can also include a graphical ADS-B In Guidance Display (AGD) operationally connected to the TCAS computer. FIG. 6 provides an example such an AGD, although other implementations are also permitted.

The system can further include a Multi-Purpose Control Display Unit (MCDU) operationally connected to the TCAS computer. The MCDU may include a display of information, such as a traffic list or selected traffic information or ADS-B In application specific information. There may be buttons at outer edge(s) of the display. These buttons can be configured to permit selection of a corresponding aircraft from the traffic list. The MCDU may also include a number pad and/or an alphabet pad, or an alpha-numeric keyboard. The buttons can also include scrolling buttons permitted to scroll additional information on the display.

The TCAS traffic display and MCDU can be configured to substitute for a Cockpit Display of Traffic Information (CDTI). The graphical AGD can also alone or in combination with these elements be configured to substitute for the CDTI. Thus, certain embodiments of the present invention may be capable of avoiding the need for retrofitting a cockpit to install a full CDTI.

The system can also include a traffic buffer configured to provide ADS-B In traffic to the existing TCAS traffic display to display both ADS-B In and TCAS traffic using typical TCAS symbology. The system can further include an ADS-B In traffic buffer, which includes TCAS traffic and ADS-B In specific data to transmit to the graphical AGD. The system can additionally include an MCDU interface and processing of input/outputs to one or more MCDUs. Furthermore, the system can include an MCDU display and entry page processing to provide display and control of ADS-B In and CDTI traffic information.

In certain embodiments of the present invention, various components can replace existing components of a given cockpit. For example, the graphical AGD can replace a flight deck standby indicator. Alternatively, the graphical AGD can be incorporated as an additional function of a flight deck standby indicator.

Certain embodiments of the present invention can be an apparatus that includes a display and a processor. The display can be any visual display, such as the display of a MCDU, as described above. The processor can be any computer processor or set of processors. For example, the processor can include one or more central processing unit (CPU), application specific integrated circuit (ASIC), field programmable gate array (FPGA), or other controller or microcontroller hardware. The processor can also be equipped with memory on the same chip, or memory in a separate module. The processor can be equipped with more than one memory, which can include read only memory (ROM), random access memory (RAM), or any other form of memory, including a non-transitory computer-readable medium configured to be encoded with instructions to perform a process, when the instructions are executed in hardware, such as in the processor(s). Any form of software or other computer program instructions or computer program code can be installed on the memory(ies) and/or processor(s).

The processor and display can be configured to permit selection of at least one target aircraft identified on the display. For example, there can be a plurality of buttons arranged around a periphery of the display. The plurality of buttons can be configured to operate with the processor to permit the selection of the at least one target aircraft. Alternatively, or in addition, the display can include a touch sensitive screen. The touch sensitive screen can be configured to operate with the processor to permit the selection of the at least one target aircraft. In further alternatives, selection can be done using gestures detected by a camera or other equipment or motion of an external peripheral, such as a remote control. As an additional item or further alternative, the apparatus can include an alpha-numeric keyboard provided with the display. The alpha numeric keyboard can be configured to operate with the processor to permit the selection of the at least one target aircraft. For example, a user can enter the tail number of an aircraft in order to select the aircraft. Other options are also permitted.

The processor and the display can be configured to indicate the selection on the display through a combination of symbols for each target aircraft selected. The processor and the display can also be configured to temporarily remove from the display all the other targets than the selected aircraft.

The selection can be indicated for a predetermined time or indefinitely. For example, the selection can be indicated until a predetermined further trigger occurs. The selection can be indicated until, for example, a traffic alert occurs or a timer expires.

The processor and the display can be configured to indicate the selection by displaying, for each selected aircraft, a set of relatively offset multiple nearly co-located icons, such that the set of multiple nearly co-located icons appear as a combined symbol. Alternatively, or in addition, the processor and the display can be configured to indicate the selection by, for each selected aircraft, repeatedly changing a symbol associated with the selected aircraft.

The processor and the display can be configured to present a list of target aircraft. The selection of the at least one target aircraft can be from the list of target aircraft. The processor can be configured to present the list as a list of aircraft of interest based on at least one criterion. The criterion can be or include at least one of an aircraft being of relevance to a given operation or the aircraft having triggered an alert. In certain cases, the aircraft may be relevant to multiple operations, may have triggered multiple alerts, or both may be relevant to one or more operations and may also have triggered one or more alerts. The alert can be a traffic or collision avoidance alert, for example.

The selection permitted by the processor and display can be, for example, selection of traffic to follow. The processor can be further configured to highlight, on at least one interface, a target aircraft as being traffic to follow based on the selection.

In other, possibly complimentary or combined, embodiments of the present invention, an apparatus may include a display and a processor, as described above. The processor and the display can be configured to permit selection of at least one target aircraft identified on the display. The processor and the display can also be configured to temporarily remove from the display all the other targets than the selected aircraft The temporary removal can be for a predetermined time, such as for a few seconds or one minute. The processor and the display can be further configured to alter an appearance of the selected aircraft. For example, the altered appearance comprises displaying a combination of symbols for each target aircraft selected.

For example, the processor and the display can be configured to highlight a target on the display by repeatedly changing a symbol associated with the target. This may give the target the appearance of blinking, such as when the symbol changes between a filled symbol and a hollow symbol. The change can be periodic or aperiodic. This blinking (or other indication of selection) may be discontinued when a new aircraft is selected, when a triggering event occurs (such as a traffic advisory), when a timer expires, or when a user turns off the indication.

Highlighting can also be performed by decluttering the display of all other targets. This decluttering can be done for a limited time, such as a number of seconds or a minute. Optionally, rather than completely removing the other targets, the brightness or color of the other targets can be muted or lowered. For example, if the other targets are normally displayed at 100% brightness, they could instead be displayed at 50% brightness, while the selected target of interest is maintained at 100% brightness.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method of displaying Automatic Dependent Surveillance-Broadcast (ADS-B) In information, the method comprising:
   controlling, by a traffic computer, a Traffic Alert and Collision Avoidance System (TCAS) traffic display, a Multi-Purpose Control Display Unit (MCDU), and a graphical ADS-B In Guidance Display (AGD);
   displaying ADS-B In information on the TCAS traffic display;
   displaying, on the MCDU, Cockpit Display of Traffic Information (CTDI).

2. The method of claim 1, further comprising:
   a traffic buffer providing ADS-B In traffic to a TCAS traffic display;
   wherein the displaying the ADS-B In information on the TCAS traffic display comprises displaying the ADS-B In information and TCAS traffic using typical TCAS symbology.

3. The method of claim 1, further comprising:
   processing inputs/outputs to one or more MCDUs.

4. The method of claim 1, further comprising:
   controlling ADS-B In and CDTI traffic information via an MCDU display.

5. The method of claim 1, further comprising,
   transmitting TCAS traffic and ADS-B In specific data from an ADS-B In traffic buffer to the graphical AGD.

6. A non-transitory computer-readable medium storing thereon software instructions which, when executed, cause a processor of a traffic computer to implement a method comprising:
   controlling a Traffic Alert and Collision Avoidance System (TCAS) traffic display, a Multi-Purpose Control Display Unit (MCDU), and a graphical ADS-B In Guidance Display (AGD);
   displaying ADS-B In information on the TCAS traffic display;
   displaying, on the MCDU, Cockpit Display of Traffic Information (CTDI).

7. The non-transitory computer-readable medium of claim 6, wherein the method further comprises:
   a traffic buffer providing ADS-B In traffic to a TCAS traffic display;
   wherein the displaying the ADS-B In information on the TCAS traffic display comprises displaying the ADS-B In information and TCAS traffic using typical TCAS symbology.

8. The non-transitory computer-readable medium of claim 6, wherein the method further comprises:
   processing inputs/outputs to one or more MCDUs.

9. The non-transitory computer-readable medium of claim 6, wherein the method further comprises:
   controlling ADS-B In and CDTI traffic information via an MCDU display.

10. The non-transitory computer-readable medium of claim 6, wherein the method further comprises:
    transmitting TCAS traffic and ADS-B In specific data from an ADS-B In traffic buffer to the graphical AGD.

* * * * *